US012737660B2

(12) United States Patent
Taminiau et al.

(10) Patent No.: US 12,737,660 B2
(45) Date of Patent: Sep. 15, 2026

(54) METHOD AND SYSTEM FOR OPERATING A QUANTUM NETWORK NODE

(71) Applicants: Technische Universiteit Delft, Delft (NL); Universität Innsbruck, Innsbruck (AT)

(72) Inventors: Tim Hugo Taminiau, Delft (NL); Conor Eliot Bradley, The Hague (NL); Ronald Hanson, The Hague (NL); Simon Baier, Innsbruck (AT)

(73) Assignees: Technische Universiteit Delft, Delft (NL); Universität Innsbruck, Innsbruck (AT)

(*) Notice: Subject to any disclaimer, the term of this patent is extended or adjusted under 35 U.S.C. 154(b) by 319 days.

(21) Appl. No.: 18/697,940

(22) PCT Filed: Oct. 4, 2022

(86) PCT No.: PCT/NL2022/050555
§ 371 (c)(1),
(2) Date: Apr. 2, 2024

(87) PCT Pub. No.: WO2023/059185
PCT Pub. Date: Apr. 13, 2023

(65) Prior Publication Data

US 2025/0013903 A1 Jan. 9, 2025

(30) Foreign Application Priority Data

Oct. 4, 2021 (NL) ..................................... 2029318

(51) Int. Cl.
*G06N 10/40* (2022.01)

(52) U.S. Cl.
CPC ................................... *G06N 10/40* (2022.01)

(58) Field of Classification Search
CPC ..................................................... G06N 10/40
See application file for complete search history.

(56) References Cited

U.S. PATENT DOCUMENTS 9,361,962 B2 6/2016 Kucsko et al.
2015/0009746 A1* 1/2015 Kucsko ................. B82Y 10/00
365/152

OTHER PUBLICATIONS

"Robust Quantum-Network Memory Using Decoherence-Protected Subspaces of Nuclear Spins" Andreas Reiserer, Norbert Kalb, Machiel S. Blok, Koen J. M. van Bemmelen, Tim H. Taminiau, and Ronald Hanson Phys. Rev. X 6, 021040 Published Jun. 22, 2016 vol. 6, Iss. 2—Apr.-Jun. 2016.*

(Continued)

*Primary Examiner* — Brigitte A Paterson
(74) *Attorney, Agent, or Firm* — Steven M. Koehler; Westman, Champlin & Koehler, P.A.

(57) ABSTRACT

Method for operating a quantum network node comprising an electron spin host providing an electron spin for a communication qubit and a nuclear spin host providing a nuclear spin for a data qubit. The method comprises: data qubit state preparation; entanglement, comprising subjecting the electron spin to a protocol comprising multiple repetitions of a primitive for entangling with another quantum system; and data qubit state use, comprising performing operations on and/or readout of the data qubit state or causing entanglement between the data qubit state and a further quantum system. When the wanted (unwanted) state of the electron spin host is a wanted (an unwanted) charge state, the protocol comprises charge state resetting. The method may also or alternatively comprise determining an average unwanted state electron spin value when the electron spin host is in the unwanted state, and further steps in the entanglement protocol.

20 Claims, 6 Drawing Sheets system components

(56) References Cited

OTHER PUBLICATIONS

Blok et al. "Towards Quantum Networks of Single Spins: Analysis of a Quantum Memory with Optical Interface in Diamond", Faraday Discussions, Jun. 23, 2015, 18 pages.

Kalb et al. "Dephasing Mechanisms of Diamond-Based Nuclear-Spin Memories for Quantum Networks", Physical Review A, Jun. 20, 2018, pp. 062330-1-062330-10, vol. 97, No. 6.

Hopper et al. "Real-Time Charge Initialization of Diamond Nitrogen-Vacancy Centers for Enhanced Spin Readout", Arxiv Cornell University, Jul. 20, 2019, 21 pages, retrieved from https://arxiv.org/pdf/1907.08741.

Maurer et al. "Room-Temperature Quantum Bit Memory Exceeding One Second", Science, Jun. 8, 2012, p. 1283-1286, vol. 336, No. 6086.

Maze et al. "Elctron Spin Decoherence of Single Nitrogen-Vacancy Defects in Diamond", Physical Review B, Sep. 23, 2008, pp. 094303-1-094303-7, vol. 78, No. 9.

Pfender et al. "Nonvolatile Nuclear Spin Memory Enables Sensor-Unlimited Nanoscale Spectroscopy of Small Spin Clusters", Nature Communications, Oct. 10, 2017, 12 pages, vol. 8, No. 834.

Pompili et al. "Realization of a Multinode Quantum Network of Remote Solid-State Qubits", Science, Apr. 16, 2021, pp. 259-264, vol. 372, No. 6539.

Reiserer et al. "Robust Quantum-Network Memory Using Decoherence-Protected Subspaces of Nuclear Spins", Physical Review X, Jun. 22, 2016, pp. 021040-1-021040-8, vol. 6, No. 2.

International Search Report and Written Opinion in corresponding International Application No. PCT/NL2022/050555 dated Jan. 20, 2023.

* cited by examiner

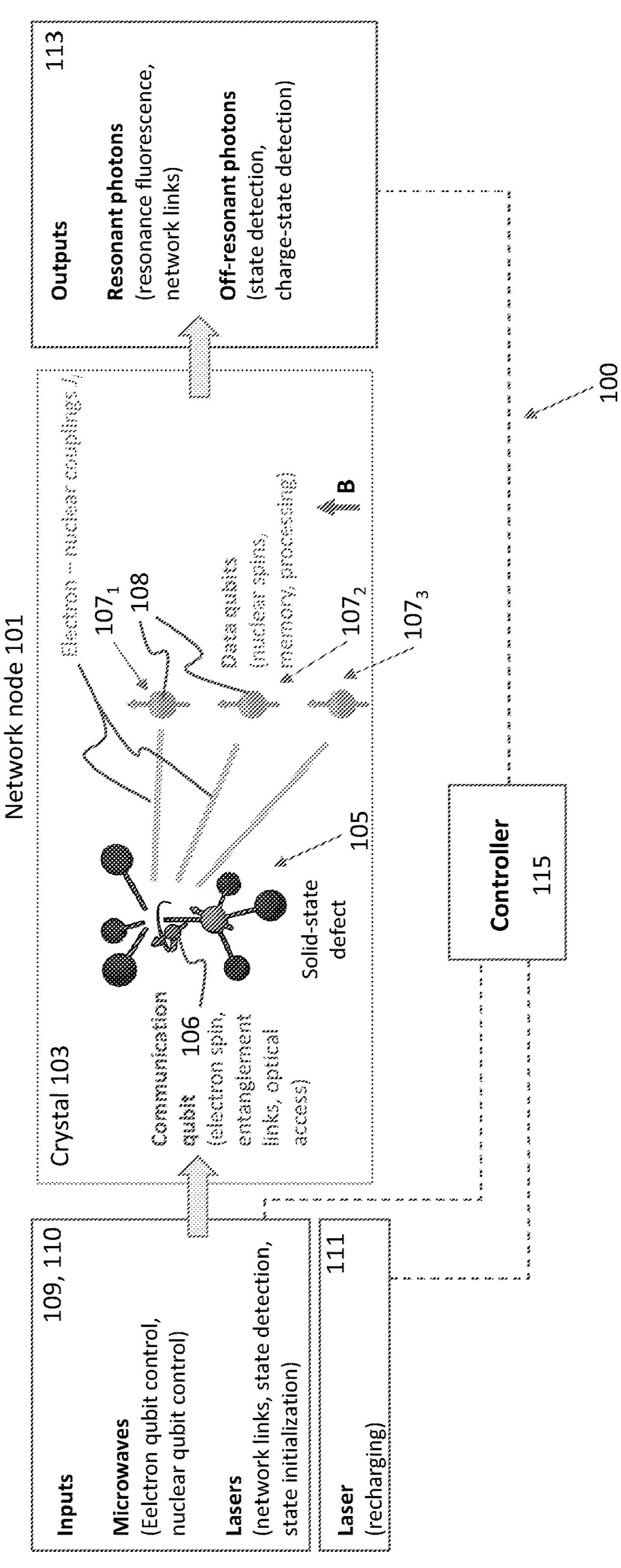
Fig. 1(a): system components

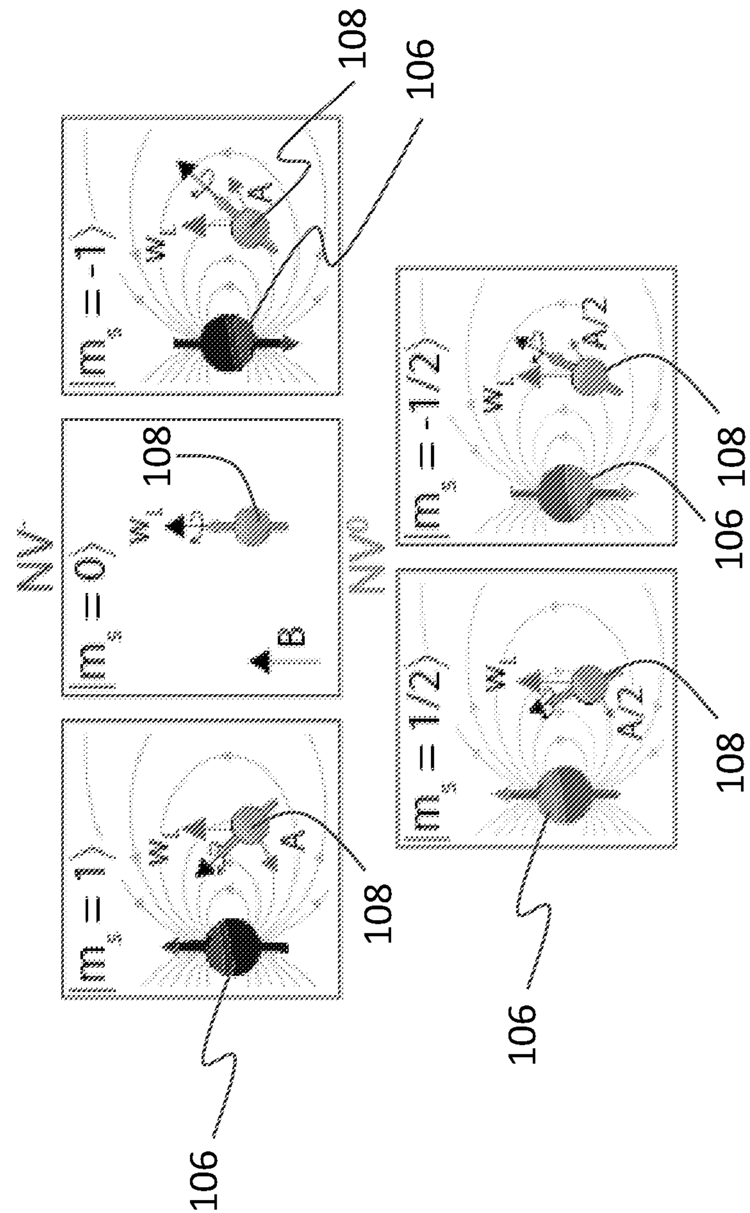
Fig. 1(b): electron spin – nuclear spin interaction

Fig. 2(a)-2(c): Control sequences for quantum memory robust to ionization
Entanglement process
BS
110
110
N
EP
106
Ent
106

Entanglement link
Communication qubit
EP
P
1
2
3
N
α
E'
$E_y$
π
t'
$t_{mw}$
$t_l$ Example
Data qubit
N/16
π
N/16
8
X/Y

METHOD AND SYSTEM FOR OPERATING A QUANTUM NETWORK NODE

CROSS-REFERENCE TO RELATED APPLICATION(S)

The present application is a Section 371 National Stage Application of International Application No. PCT/NL2022/050555, filed Oct. 4, 2022 and published as WO 2023/059185 A1 on Apr. 13, 2023, and further claims priority to Netherlands patent application no. 2029318, filed Oct. 4, 2021.

TECHNICAL FIELD

The present application relates to a wide-bandgap solid-state material comprising at least one electron spin host providing an electron spin for a communication qubit and at least one nuclear spin host providing a nuclear spin for a data qubit, the electron spin and the nuclear spin being magnetically coupled, wherein the method comprises the steps of

- data qubit state preparation, comprising preparing the nuclear spin in a predetermined nuclear quantum state forming a data qubit state;
- entanglement, comprising subjecting the electron spin to an entanglement protocol comprising multiple repetitions of an entanglement primitive for entangling with another quantum system, in particular another quantum network node; and
- data qubit state use, comprising performing operations on and/or readout of the data qubit state or causing entanglement between the data qubit state and a further quantum system.

The electron spin host can occupy a wanted state of the electron spin host, e.g. a state in which the electron spin is available for the entanglement primitive, and an unwanted state of the electron spin host in which the electron spin is unavailable for the entanglement primitive.

BACKGROUND

Methods, and systems for it, as described above are known, e.g. (operation of) a network system wherein diamond is the solid state material, in which a defect in the diamond, such as an NV-defect, provides the electron spin host and a $^{13}C$ atom provides the nuclear spin host; see, e.g. M. Pompili et al., "Realization of a multimode quantum network of remote solid-state qubits", Science 372, 259-264 (2021), A Reiserer et al., "Robust quantum-network memory using decoherence-protected subspaces of nuclear spins", Phys. Rev. X 6, 021040 (2016) and N. Kalb et al, "Dephasing mechanisms of diamond-based nuclear-spin memories for quantum networks", Phys. Rev. A 97, 062330 (2018).

In the method predetermined nuclear quantum state may be a specific state or a superposition of specific states, which may or may not be entangled with a quantum state of one or more other qubits, e.g. other data qubits in a quantum network.

The entanglement protocol may comprise substantially identical entanglement primitives or at least some entanglement primitives may differ from others. Different entanglement primitives may be executed in any suitable sequence, periodic or aperiodic.

In the wanted state of the electron spin host, the electron spin has one or more pairs of spin states as communication qubit basis states for the entanglement protocol. The wanted state of the electron spin host can be a state wherein the electron spin is in a predetermined quantum state that can be directly used for an entanglement primitive or wherein the electron spin can be readily pumped into such predetermined quantum state, e.g. by application of radiation resonant to a particular transition of the electron spin host for controlling the electron spin and/or for electron-photon entanglement. The unwanted state can be a state wherein the electron is unavailable for the entanglement primitive and/or wherein the electron switches between spin states uncontrollably and/or a state wherein dephasing of the nuclear spin is rapid and/or erratic. Note that in some practical systems different states may each be an unwanted charge state. In particular, the wanted state may be a wanted charge state and the unwanted state may be an unwanted charge state, e.g. an ionized state wherein the electron spin host has lost or gained an electron preventing electron spin states suitable for the desired entanglement.

In the aforementioned exemplary case of an NV-defect in diamond, the wanted state may be the $NV^-$ state and the unwanted state may be the $NV^0$ state.

In practice, repeated operation of the entanglement primitive may cause that the electron spin host ends up in the unwanted state. Further, for quantum network operation, it is essential that coherence of the data qubit is protected during operation of the network. Operation of the network typically requires (repetition of) a cycle of entanglement generation processes in the electron spin host including some time in the unwanted state, i.e. a method cycle comprising entanglement generation process in the electron spin host=>(unwanted) transition to unwanted state=>time spend in unwanted state=>reset of the electron spin host to the wanted state=>time spent in wanted state of the electron spin host, preferably with the electron spin in a wanted spin state with high fidelity=>continue or repeat entanglement generation process.

Therefore, there is a desire for methods and systems which reduce effects of such loss of the wanted state.

SUMMARY

To that end, herewith a method is provided according to the appended claims and the following disclosure. In the method the steps of data qubit preparation, entanglement and data qubit use are executed sequentially. In an aspect, the wanted state is a wanted charge state and the unwanted state is an unwanted charge state and wherein the method comprises that the entanglement protocol comprises the step of charge state resetting: resetting a charge state of the electron spin host from the unwanted charge state to the wanted charge state.

For, it has now been found that resetting a charge state of the electron spin host need not be accompanied by resetting of the data qubit, but may be achieved, and the electron spin may be made available again for repetitions of the entanglement primitive, within the coherence time of the data qubit and without significant dephasing of the data qubit. Thus, charge state switching may be included in the entanglement protocol and the data qubit may still be used thereafter with acceptable fidelity.

Thus, effects of ionization of the electron spin host on the data qubit are mitigated.

The reset may preserve the quantum state of the data qubit (nuclear spin) with high quality. The quality may be such that the fidelity loss for the data qubit due to the reset is less than 5%, less than 1% is desirable and considered presently achievable, even lower losses such as 0.1% are preferred and are expected to be feasible. In practice, an (un-) acceptable fidelity loss value may depend on a larger-scale system comprising the system presented herein. A fidelity loss of about 1% or less may be required for large scale applications envisioned in future; since the sensitivity of such larger-scale systems overall crucially depends on fidelity of each qubit and entanglement link, the lower the fidelity loss is, the better.

Also or alternatively, in another aspect it has been found that effects of a state change of the electron spin host on the data qubit may be mitigated by accounting for dephasing due to dynamics of the electron spin in the unwanted state. Dephasing of the data qubit during evolution in the unwanted state may be reduced or removed. This may be done by controlled provision of an average phase evolution on the nuclear spin in the desired state under the entanglement protocol by varying for a series of the entanglement primitives, providing an average series electron spin value of the series of entanglement primitives in accordance with the average unwanted state electron spin value, preferably substantially matching the average unwanted state electron spin value. The variation may comprise selecting different electron spin states ($m_s$=−1, 0, +1) as mutually different basis states ($\{|0\rangle, |{+1}\rangle\}$, $\{|0\rangle, |{-1}\rangle\}$) for different applications of the entanglement primitive in the series of the entanglement primitives from the outset, e.g. preparing the electron spin in such basis. Also or alternatively, the variation may comprise switching between basis states within an entanglement primitive by application of a n-pulse along the entanglement primitive to switch to another basis within the primitive (e.g. switching from ($\{|0\rangle, |{-1})\}$ to $\{|0\rangle, |1\rangle\}$).

The average unwanted state electron spin value may be determined by motional narrowing of the electron spin host in the unwanted state. E.g. the average unwanted state electron spin value may be 0 as a result of motional narrowing of the electron spin between $m_s=\pm\frac{1}{2}$ states. By appropriate selection of the electron spin states of the series, the average series electron spin value may be determined, e.g. by selecting basis states $m_s=\{0, +1\}$ and $\{-1, 0\}$ equally often within the series (such as alternating after each repetition or other predetermined numbers of repetitions or switching one or more times within a single repetition), an average series electron spin value of 0 may be provided, which may match the aforementioned average unwanted state electron spin value of 0.

The nuclear spin data qubit may be preserved to a high probability (e.g. 95% or higher, preferably 97% or more such as 99% or above) while the electron spin/charge state is recovered by the reset with high probability (e.g. 95% or higher, preferably 97% or more such as 99% or above).

The method may comprise, when the entanglement protocol comprises the step of charge state resetting, that the step of charge state resetting comprises irradiating the electron spin host with electromagnetic radiation promoting or causing the change of the charge state of the electron spin host from the unwanted charge state to the wanted charge state. This radiation may in particular comprise resonant optical radiation such as resonant laser light.

Electromagnetic radiation provides a versatile and well-controllable tool for causing or realizing the charge state reset. In case the radiation comprises resonant electromagnetic radiation, this may be resonant with one or more transitions.

In some cases combinations of transitions may be used which may or may not have resonances with particular wavelengths. E.g., in the case of an NV-defect in diamond the radiation may be resonant with a ground state to an excited state transition in $NV^0$, where no energy is lost to phonons. Then, from the excited state the defect may capture an electron from outside the defect (e.g. from a conduction or valence band) and relax into an NV-state. Also or alternatively, a transition from the $NV^0$ excited state to the $NV^-$ state may be induced by a radiation or radiation-assisted transition.

As a relevant property of the charge state resetting is considered that it takes the electron spin host from the unwanted charge state into the wanted charge state with very high fidelity and with limited other disturbance, in particular without leading to substantial dephasing of the data qubit.

The resonant electromagnetic radiation may be applied continuously but preferably pulsed in any suitable time pattern; see below.

As an example, recharging an NV-site in diamond with off-resonant excitation or similar techniques are estimated to produce a fidelity loss for the data qubit of between 30% and 100%. Resonant recharging, in particular in combination with a low magnetic coupling between the electron spin host and the nuclear spin host, has shown to provide significantly less losses, and hence improved fidelities.

The data qubit may have a coherence time and the method may comprise performing the step of charge state switching in a time interval shorter than the coherence time. E.g. the method may comprise determining a data qubit coherence decay time for the electron spin host being in the unwanted state and performing the step of charge state resetting faster than that data qubit coherence decay time. Note that determining a qubit coherence time is best done using a different sequence than the entanglement sequence, e.g. as (part of) a system characterization.

Note that operation of a quantum process such as the presently provided method need not be solely about speed and time, but rather about phase and predictability thereof. Phase evolution of a data qubit in the presently considered method and system depends on the magnetic coupling strength J between the electron spin host and the nuclear spin host. Fidelity of the method may depend on (coupling strength differences)×(time uncertainty of/in method steps), wherein coupling strength differences may depend, inter alia, on states of the electron spin host. Quantifying fidelity may in practice depend on the contrast of a measurement, but assuming that the contrast is very good, which should be the case for any useful quantum bit, and that uncertainty scales with the square root of the number of measurements as customary, then, to determine a fidelity loss to 1% accuracy measurement on the of 100 repetitions are preferred if not required. To determine fidelity to order 0.1% about 10.000 repetitions are needed, etc.

The data qubit coherence decay time may be calculated and/or measured. A measurement for that may be done apart from the step of entanglement, e.g. using a different sequence than the entanglement sequence and/or as a separate step prior to data qubit state preparation. The data qubit coherence time may be controlled by controlling an external magnetic field about the electron spin host and nuclear spin host.

The data qubit coherence decay time may in particular depend on the magnetic coupling between the electron spin (host) and nuclear spin (host) within the material. It is noted that a smaller coupling between electron spin and nuclear spin reduces sensitivity of the nuclear spin to the NV-center charge state. Nuclear spins with small couplings can be preferably selected as data qubits. Measuring the couplings could be done as part of characterization of (potential) nodes, before selecting the nodes or data qubits to be used in the quantum network node.

The magnetic coupling may be a result of a separation between the respective hosts (electron spin host and nuclear spin host). Typically suitable separations of an electron spin host and a nuclear spin host may be below 5 nm e.g. below 4 nm, preferably below 3 nm, or below 2 nm, below 1 nm or even below 0.5 nm; the lower the separation is, typically the larger is the coupling. Such separations may be provided by a concentration of impurities and/or defects and/or isotope concentrations in the solid-state material. These may be adjusted during growth of the material to provide couplings of a range of (small) predetermined values (isotopic engineering; possibly combined with structured growing techniques wherein concentrations are varied within an object during growth resulting in local concentration variations). It is in particular desired that the electron spin host and nuclear spin host are close together, but that other nuclear spin hosts are—in comparison—far removed from the considered electron spin host and nuclear spin host, e.g. 2 or more times further separated, in particular 5 or 10 times further away or more; this reduces interference between qubit states of and/or operations on (the spins of) respective spin hosts. Note that a single quantum node may comprise plural nuclear spin hosts to provide as many data qubits. In such case, it is desired that the respective plural nuclear spin hosts are relatively strongly coupled with, and/or relatively close to, the electron spin host, whereas other (potential) nuclear spin hosts are significantly further away from and/or weakly coupled to electron spin host. This may be achieved by structured manufacturing of the solid-state material (see also below).

E.g. experiments by the inventors have shown that in the particular example of diamond the data qubit coherence time when the NV-defect is in the $NV^0$ state (the 'unwanted', ionized state) may be significantly larger than the time needed to recharge (i.e. deionize) the NV-defect (back to $NV^-$). This allows that suitable optical pulses and/or combinations of pulses can be applied to bring the NV-center back to $NV^-$ from NV without losing the data qubit.

Note that the NV electron spin coherence and optical coherence may be controlled by cooling the solid-state material, e.g. to temperatures below 100 K, e.g. 77 K or preferably below 10 K, such as 4 K or lower.

The method may comprise selecting a portion of the solid-state material comprising the nuclear spin host and the electron spin host, wherein the nuclear spin host and the electron spin host have a predetermined coupling strength, wherein the coupling strength is between 100 Hz and 100 MHz, preferably between 100 Hz and 1 MHz, more preferably between 100 Hz and 100 kHz, such as between 100 Hz and 1 kHz. In general, it is preferable that the coupling is selected to be as high as possible, but not so high that the data qubit fidelity is diminished by dephasing due to ionization of the electron spin host.

Also or alternatively, the method may comprise selecting a portion of the solid-state material comprising the nuclear spin host and the electron spin host, in the portion of the solid-state material the concentration of the nuclear spin host and preferably also of the electron spin host is between 0.01% and 1%, preferably between 0.01% and 0.5% more preferably between 0.01% and 0.1%; e.g. between 0.01% and 0.05%.

It has been found that such couplings and/or concentrations simplify achieving both reliable gate operations and long nuclear coherence times together with low effects of charge state resetting operations using light. E.g. in case of diamond, a natural abundance of $^{13}C$ atoms may be typically about 1.1%, whereas artificially grown diamonds may be provided at $^{13}C$ concentrations of values such as 0.01%, 0.02%, 0.03%, 0.05%, 0.1%, 0.2%, 0.3%, 0.5% and other values up to the natural value. The lower the concentration, the lower the coupling strength between the electron spin host and the nuclear spin host; this may in some cases reduce gate speeds, but it has been found that that is not a relevant limiting factor in current quantum network experiments, and in any case outweighed by the benefits of improved network operation reliability.

In an embodiment, the entanglement protocol comprises in or between plural repetitions of entanglement primitives the step of charge state resetting or at least a step of attempting charge state resetting, e.g. irradiating the electron spin host with electromagnetic radiation promoting or causing the change of the charge state of the electron spin host from the unwanted charge state to the wanted charge state, which radiation in particular may comprise resonant optical radiation such as resonant laser light.

After the charge state reset, the electron spin may be prepared for a further entanglement attempt.

Such embodiment may comprise the step of (attempting) charge state resetting in every repetition of the entanglement primitive, or in only part of the repetitions such 2*s* as once per 2, 10, 100, 500, 1000, 5000 or 10000 repetitions. The frequency of (attempting) charge state may vary within the entanglement protocol and/or between different instances of performing the entanglement protocol and/or the method as a whole; this may for instance be dependent on detection of system parameters indicative of one or more system status details, e.g. a temperature variation, a laser power variation and/or a resonance variation of one or more irradiation sources.

Performing the step of (attempting) charge state resetting takes valuable time and irradiating the electron spin host may heat the solid-state material which may negatively affect the material and/or coherence times of the system; it is therefore beneficial to perform the step of (attempting) charge state switching not too often. Since in practice transition from the wanted charge state into the unwanted charge state may occur stochastically and relatively rarely, performing the step only once per large number of repetitions of the entanglement primitive may suffice for sufficient probability to reset the charge state of the electron spin host.

The step of charge state resetting, e.g. irradiating the electron spin host with electromagnetic radiation promoting or causing the change of the charge state of the electron spin host from the unwanted charge state to the wanted charge state may be performed regardless of the actual charge state of the electron host. Hence, in case the electron spin host is actually in the wanted charge state at that time, the step may be no more than an attempt to a charge state reset, since the charge state does not need a reset.

In order to prevent unnecessarily attempting charge state resetting, the step of performing a charge state resetting may be made conditional on the actual charge state of the electron spin host and the method may comprise that the entanglement protocol comprises the step of performing a status check, comprising determining a charge state of the electron spin host, wherein the entanglement protocol comprises selectively executing or not, on the basis of the status check the step of charge state resetting.

The method may then comprise that the status check comprises detecting a predetermined number of photons indicative of one or more electron spin states of the wanted charge state of the electron spin host.

By setting a detection threshold of a predetermined number of photons, reliability of the detection may be increased.

The status check may comprise subjecting the electron spin host with radiation exciting an electron transition associated with the one or more electron spin states of the wanted charge state of the electron spin host to cause emission of the photons for detection; the radiation preferably being resonant with one or more transitions. The transition may be a spin pumping transition.

The predetermined number of photons may be selected depending on desired reliability of the check, reliability of detection systems, background noise, etc. A low number accelerates the check, a higher number may increase reliability. Typically suitable numbers are a range or a particular value between 1 and 25 photons, e.g. minimally 3 or minimally 10 or minimally 15 photons such as 5, 13, or 20 photons.

In an embodiment, during the step of entanglement, the nuclear spin is repeatedly subjected to controlled rotation. In particular the nuclear spin may be subjected to decoupling sequence such as an echo sequence. A suitable echo sequence could be an XY8 decoupling sequence, well known per se.

Thus, the nuclear spin is decoupled from (dynamics of) the electron spin. Thus, decoherence effects from the electron spin (dynamics) are mitigated for the data qubit.

The method may comprise the step of determining an electron spin state of the electron spin host when the electron spin host is in an unwanted state, which may be an unwanted charge state. The determination may comprise calculations and/or measurement of the electron spin state of the electron spin host in the unwanted state.

The determination may be done once or plural times within the method.

It has been found that generally, the electron spin state of the electron spin host in the unwanted state exhibits the same behavior for prolonged periods of hours or even up to days or longer. Thus, such electron spin state may be considered as a system constant for performing the method, and the determination may be done occasionally for checking. Thus, in the case that the spin state that is created after switching to the unwanted state is unpredictable, but once created is a stable state, it is possible to measure that spin state using optical radiation, so that the phase evolution of the data qubit becomes known.

In case the thus determined electron spin state is at least substantially constant during the time of plural repetitions of the entanglement primitive, the effect of the thus determined electron spin state for dephasing of the data qubit may be accounted for, e.g. by adding or subtracting a predetermined phase to a measured phase of the data qubit. Thus, in the case that the spin state primarily goes to the same stable state upon switching to the unwanted state, this state can be characterized so that the phase evolution of the data qubit becomes known.

In other cases, it may be found that the electron spin state is fluctuating on time scales of relevance for the method making it unpredictable. This effect may be countered by the step of selecting different electron spin states for a series of entanglement primitives in the entanglement protocol as set out above.

Averaging of any effect of a fluctuating electron spin state may be simplified by accelerating the fluctuation by purposive driving the electron spin between plural spin states (engineered motional narrowing): the entanglement protocol may comprise the step of driving electron spin transitions between different electron spin states of the electron spin when the electron spin host is in the unwanted state of the electron spin host for controlling the average unwanted charge state electron spin value.

Driving electron spin transition may be done by irradiating the electron spin host with electromagnetic radiation associated with the transition, in particular resonant radiation which may comprise microwave radiation. By driving the electron spin transitions, an average unwanted state electron spin value may be controllably determined to a predetermined value. This can be called engineered motional narrowing of the electronic spin state. The average series electron spin value of the entanglement primitive series and the predetermined value may be matched to each other, thus ensuring that the data qubit experiences comparable spin values both due to the entanglement primitive series and due to the average unwanted state electron spin value.

The solid-state material may comprise or be one selected from the group consisting of diamond, silicon carbide, silicon, and 2-dimensional materials such as graphene and hexagonal Boron Nitride (hBN) or Molybdenum disulfide ($MoS_2$). The electron spin host may then be formed by an optically active defect site in the solid-state material and the nuclear spin host is formed by an isotope atom in the solid state having a nonzero nuclear spin.

In particular, in case the solid-state material comprises or is diamond, the electron spin host may be formed by a defect site in the diamond, selected from a group consisting of a nitrogen-vacancy (NV) center, a silicon-vacancy (Si-V) center, a lead-vacancy (Pb-V) center, a tin-vacancy (SN-V) center the nuclear spin host may then be formed by a $^{13}C$ atom. Also in silicon carbide and graphene the nuclear spin host may be formed by a $^{13}C$ atom. In silicon or silicon carbide the nuclear spin host may also be formed by a $^{29}Si$ atom. Other suitable nuclear spin hosts are Boron-10 and -11 ($^{10}B$ and $^{11}B$), Nitrogen-14 and -15 ($^{14}N$, $^{15}N$), and Molybdenum-95 and -97 ($^{95}Mo$, $^{97}Mo$) and Sulfur ($^{3}S$).

Associated with the preceding, herewith is provided a system for operating a quantum memory or quantum network node according to one or more embodiments of the method described herein. The system comprises a wide-bandgap solid state material, e.g. diamond, comprising at least one electron spin host providing an electron spin for a communication qubit, and at least one nuclear spin host providing a nuclear spin for a data qubit, the electron spin and the nuclear spin being magnetically coupled;

- a first electromagnetic radiation system for manipulating the electronic spin;
- a second electromagnetic radiation system for manipulating the nuclear spin; and a control system operably connected with the first electromagnetic radiation system and the second electromagnetic radiation system.

The electron spin host can occupy a wanted state of the electron spin host and an unwanted state of the electron spin host, in particular a wanted charge state and, respectively, an unwanted charge state, as explained above. In the wherein the system further has means adapted to execute the steps of the method of any one of the preceding claims, the means being operably connected with the first and second electromagnetic radiation systems.

The first and second electromagnetic radiation system may be in part the same system; i.e. sharing tools like one or more of magnetic field generators, microwave generators, radiofrequency generators, lasers, optics, etc. The system may comprise a cryostat containing the solid-state material.

The system may further comprise an electromagnetic radiation system for irradiating the electron spin host with resonant electromagnetic radiation for resetting a charge state of the electron spin host from the unwanted charge state to the wanted charge state. The radiation system may in particular be configured for providing optical radiation such as laser light, wherein the radiation may be resonant with a particular transition of the electron spin host.

In an embodiment, the solid-state material comprises diamond, the electron spin host is an optically active defect site in the diamond, selected from a group consisting of a nitrogen-vacancy (NV) center, a silicon-vacancy (Si-V) center, a lead-vacancy (Pb-V) center or a tin-vacancy (SN-V) center, and wherein the nuclear spin host is formed by a $^{13}C$ atom.

Herewith is also provided a computer program product comprising instructions to cause any embodiment of a system described herein to execute the method steps of any embodiment described herein.

Further, a computer readable medium having stored thereon the aforementioned computer program product is provided.

For further appreciating the preceding, the following is noted. An important figure of merit for the method and system (see below) is fidelity or fidelity loss. The process [unwanted ionization to unwanted state (e.g. $NV^0$)]=>[potential time spend in NV0]=>[successful recovery of wanted charge and spin states (e.g. $NV^-$ and spin state)] during the step of entanglement should incur a limited fidelity loss on the nuclear spin data qubit. E.g., 10% fidelity loss is considered too much for large scale quantum network applications; likely such a system is simply useless for practical applications. At a fidelity loss of about 1%, operation of such large-scale system might become possible. A 0.1-0.01% fidelity loss is desired for practical uses. Even lower values could be but may not be possible or desired due to trade-offs with other parameters. It has been found that fidelity loss may scale inversely with the coupling strength J of the magnetic coupling between the electron spin host and the nuclear spin host. In a particularly simple model one may consider dephasing=J*(time uncertainty), wherein the uncertainty in time may depend on system dynamics. Therefore, one way of achieving the desired fidelity loss by lowering J. However, lower J also means lower operation speed, so an optimum may be determined.

For a given combination of electron spin host and nuclear spin host, it is non-trivial to predict or calculate ta fidelity loss for given J. Therefore, this may require characterization. A method to do so is given in FIG. 4, see below. Such a measurement validates whether the coupling J of the selected combination is small enough or not by comparing the result to a fidelity threshold (e.g. 0.1% loss).

Any method herein may therefore comprise determination of a magnetic coupling strength between an electron spin host and individual ones of plural nuclear spin hosts in the solid-state material, and selecting one or more nuclear spin hosts for the further method, based on the respective coupling strengths J between the electron spin host and the respective nuclear spin hosts.

To facilitate one or more of the selection of the one or more individual nuclear spin hosts, reduction of chances of undesired interaction (e.g. "cross talk") with other nuclear spin hosts when operating on a particular combination of electron spin host-nuclear spin host, and sufficient (de) coupling between different nuclear spin hosts, a suitable concentration of nuclear spin hosts maybe selected and/or provided in the solid-state material. For low concentrations of nuclear spin hosts, J tends to be linearly proportional to the concentration.

A suitable balance between fidelity (low J) and speed (high J) for the method and of the system considered herein may depend on components and operation of a large-scale network comprising the system disclosed herein and in which any method provided herein is performed.

BRIEF DESCRIPTION OF THE DRAWINGS

The above-described aspects will hereafter be more explained with further details and benefits with reference to the drawings showing a number of embodiments by way of example.

FIG. 1(*a*) is a brief overview of system components:

FIG. 1(*b*) indicates electron-nuclear hyperfine coupling in various cases of interest in this disclosure: precession of a nuclear-spin at the Larmor frequency $\omega_L$ around an external magnetic field B is perturbed by the presence of the electron spin. Depending on the NV charge and spin states: $NV^-$ (dark, top row), $m_s=\{-1, 0, 1\}$, or $NV^0$ (medium color; bottom row), $m_s=\{-½, +½\}$, the precession frequency and axis of the nuclear spin (light color, top row and bottom row) are modified:

FIG. 2(*b*) indicates an exemplary entanglement primitive;

FIG. 2(*c*) indicates an exemplary nuclear spin echo sequence;

FIG. 2(*d*) shows experimental results of indicates data qubit expectation value a superposition state, as a function of a number of entanglement attempts:

FIGS. 5(*b*)-5(*d*) show different resetting blocks for the primitive of FIG. 5(*a*).

DETAILED DESCRIPTION OF EMBODIMENTS

Figures 2A, 2B, 2C:
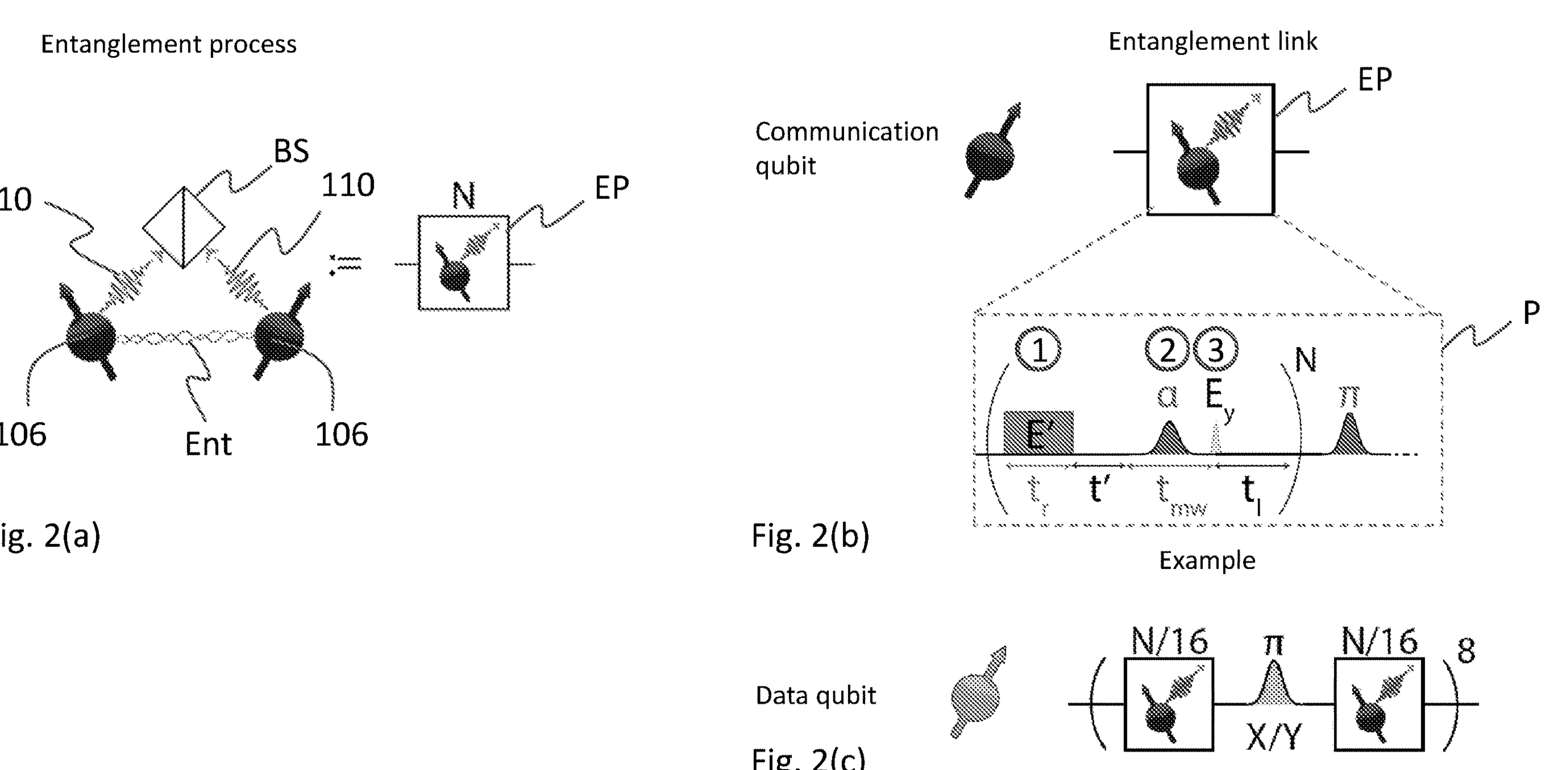
FIG. 2(*a*) indicates an exemplary remote entanglement process.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualized with alphabetic suffixes. In this disclosure, the verb "to facilitate" is intended to mean "to make easier and/or less complicated", rather than "to enable".

FIG. 1(*a*) indicates a system 100 for the presently provided method. The system 100 comprises a quantum network node 101, comprising a wide-bandgap solid-state crystal 103 that is subject to an external magnetic field B and that has an optically active solid-state defect 105, here an NV defect, which provides an electron spin 106. The solid-state defect 105 therewith forms an electron spin host for a communication qubit. The node comprises in the crystal 103 also several nuclear spin hosts $\mathbf{107}_i$ such as $^{13}C$ atoms which each provide a nuclear spin 108 for a data qubit, here i is an identifier, in FIG. 1: $i\in\{1, 2, 3\}$). The electron spin 106 and the nuclear spins 108 are magnetically coupled with a coupling constant $J_i$, which is dependent on the particular combination of electron spin host 105 and nuclear spin host 107$_i$.

The system 100 further comprises an electromagnetic radiation system comprising one or more microwave sources, radiofrequency wave sources and laser light sources together providing a first electromagnetic radiation system 109 for manipulating the electronic spin, and a second electromagnetic radiation system 110 for manipulating the nuclear spin (first and second electromagnetic radiation systems 109, 110 not individually indicated). The system 100 also comprises a further electromagnetic radiation system 111 for irradiating the electron spin host with resonant electromagnetic radiation for resetting a charge state of the electron spin host 105 from an unwanted charge state to the wanted charge state. Further, a detection system 113 is provided for detecting data indicative of electromagnetic radiation signals from the network node 101 and/or indicative of signals from other elements of the system 100, e.g. operation signals from the first and second electromagnetic radiation systems, temperature measurement data, timing data etc. A control system 115 is operably connected with the respective electromagnetic radiation systems 109, 111 and the detection system 113 for controlling operation of the system 100. The control system 115 is adapted to execute the steps of the method of any one of the embodiments disclosed herein. For that, the controller may comprise one or more processors being programmable or programmed with a computer program for execute the steps of the method, e.g. calculating time steps and sequences. Any such program may use or comprise one more memories, libraries etc., and may be configure for controlling operation of the radiation sources etc. The controller may be connected with further controllers, computers, data processors, storage memory such as image repositories etc. Any such connection may be wired or wireless adhering to any suitable protocol including Bluetooth, Wi-Fi, etc. but also including ultra-acoustically and/or infrared communications links.

A key feature of this system is that the nuclear spin dynamics, here $^{13}C$ spin dynamics, depend on the electron spin of the electron spin host, here the NV electron spin state (FIG. 1(*b*)). This is captured by the Hamiltonian for a single nuclear spin:

$$H = \omega_L I_z + A_{\parallel} m_s I_z + A_{\perp} m_s I_x \quad \text{(Eq. 1)}$$

Here, the secular approximation is used, wherein $\omega_L = \gamma_C B_z$ is the nuclear spin Larmor frequency in which $\gamma_C$ is the gyromagnetic ratio of the nuclear spin (here $^{13}C$) and $B_z$ is the external magnetic field defining an axis, here along the NV axis. $A_{\parallel}$ and $A_{\perp}$ are electron-nuclear hyperfine coupling constants parallel and perpendicular to the axis of the electron spin host, here the NV axis. $I_z$, $I_x$ are the nuclear spin ½ operators, while $m_s$ is the spin-z projection of the electron spin.

In the $NV^-$ charge state that is used for network operation, $m_s=\{-1, 0, 1\}$ from which a qubit may be defined in the $\{-1,0\}$ basis (:={|1>, |0>}) or in the {0,1} basis. Additionally however, stochastic ionization events can convert the $NV^-$ charge state into the $NV^0$ charge state. Then the electron spin states can be $m_s$ {−½, +½}.

Thus, as seen from Eq. 1 and indicated in FIG. 1(*b*), the nuclear spin undergoes different precession dependent on the electron charge and spin states. This conditional precession enables control over the nuclear spin by controlled inversions of the electron spin. Uncontrolled electron spin dynamics, however, induce additional dephasing of the nuclear spin, which sets a limit on the achievable network number $N_{network}$.

The network number $N_{network}=r_{ent}/r_{mem}$ is the ratio of the inter-node entanglement generation rate $r_{ent}$ and the decoherence rate $r_{mem}$ of the data qubits during network operation. Without error correction, $N_{network}$ sets the available number of cycles of entanglement distribution, and thereby the depth of protocols and computations that can be performed efficiently.

Several cases may be discerned in general for a node:

In a regime of low network number, e.g. $N_{network}$ in a range of 1-10 or even below 1, the node is highly inefficient as a quantum memory and therefore as a node.

In a regime of intermediate network numbers, e.g. $N_{network}$ in a range of 10-several 100's e.g. 100, 200, 300, 500, high fidelity deterministic operations over the network could become possible, with higher values being desired.

In a regime of high network numbers, e.g. $N_{network}$>ca. 1000, quantum computers might be possible with such nodes (possibly depending on other parameters).

It is therefore desired to reach a high network number.

E.g.: a useful metric for the nuclear decoherence rate is the number of entangling attempts after which the coherence has decayed to 1/e: $N_{1/e}$. Thus, $N_{network}=r_{ent}*N_{1/e}>1000$ is highly desired. For current state of the art parameters of electron photon entanglement, the probability of successful entanglement is 1/1000. Therefore, in order to reach $N_{network}$=1.000, a nuclear decoherence rate of $N_{1/e}>1*10^6$ entanglement attempts should be strived for.

Figures 2D, 3A, 3B:
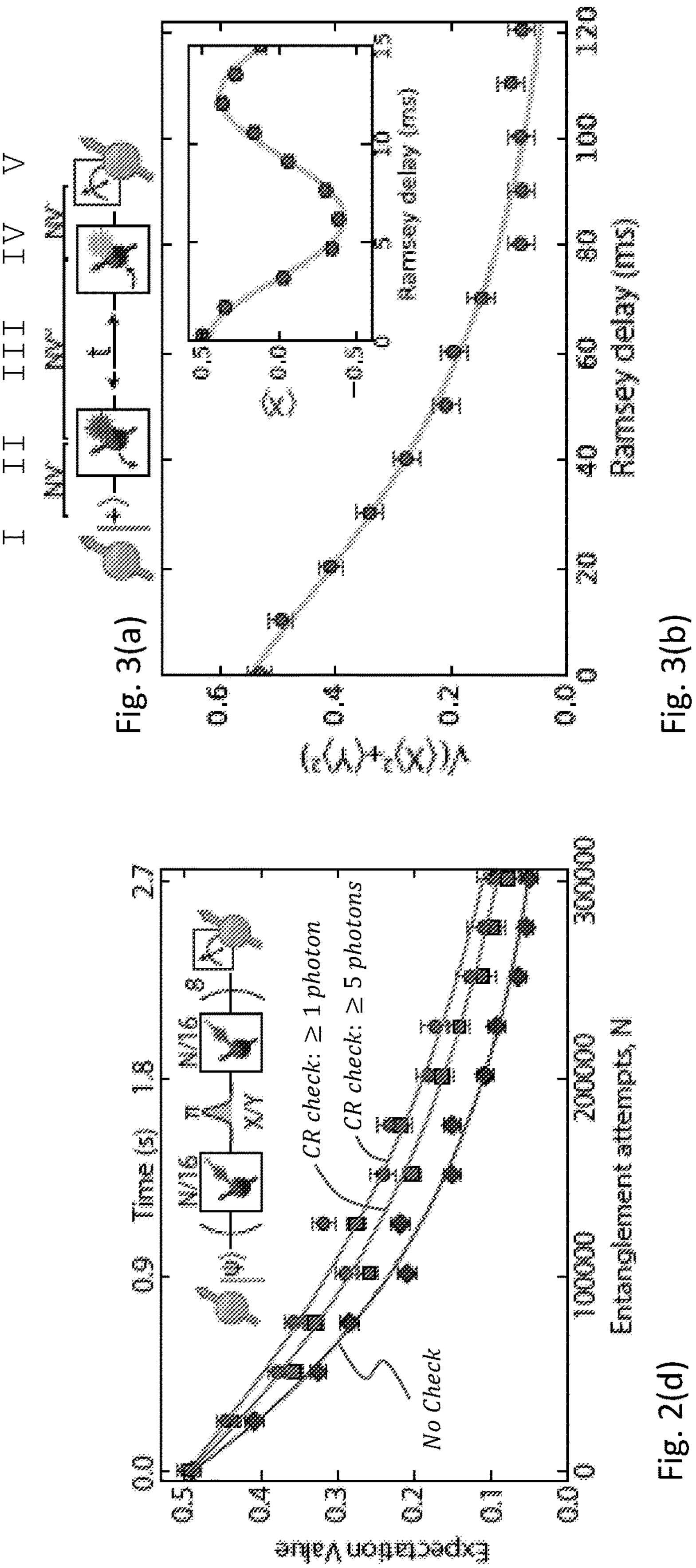
FIG. 3(*a*) indicates an experimental sequence and FIG. 3(*b*) presents measurement results using the sequence, showing that ionization and reionization of an NV-defect are possible without significant decoherence of the nuclear spin data qubit (proof not shown separately)

FIG. 2 shows exemplary remote entanglement control sequences. The exemplary entangling primitive is compatible with known single-photon schemes used in recent NV network experiments. Here, implementation of the protocol on a single network node is considered, to investigate the effect of the protocol on a data qubit, again $^{13}C$.

FIG. 2 (*a*) shows a sketch of a remote-entanglement process. After generation of local spin-photon entanglement between an electron spin 106 and a photon 110 at each node 101 (see (b)), a detection event at a central beamsplitter BS heralds remote entanglement (wavy lines Ent). The entanglement process in indicated with a symbol EP and may be attempted N times. This particular protocol is inherently probabilistic, in practice the main reduction of success rate may be due to loss processes.

FIG. 2 (*b*) shows a remote entanglement primitive P for one node, e.g. for the remote-entanglement process 200 of FIG. 2(*a*): (1) The electron spin is reset by an optical pulse at a transition E' of duration $t_r$. After a time t' a microwave α-pulse of duration $t_{mw}$ prepares a spin superposition state. (3) An optical π-pulse at a transition $E_y$ generates spin-photon entanglement, after which a time $t_1$ may be waited to determine whether the attempt succeeded. In case of success, a microwave n-pulse may be used to preserve the electron coherence.

E' and $E_y$ denote optical transitions of the electron spin host 105 and depend on the system used. Fluorescence of the electron spin host at the transition E' may also indicate that the charge state of the electron spin host is in a wanted charge state, and fluorescence at the transition $E_y$ may indicate that it is in a specific electron spin state; the transition $E_y$ may also be used for spin pumping, e.g. as part of a preparation of the electron spin for the entanglement. Also, other transitions may be used to check charge state and/or electron spin state.

In the entanglement primitive, the durations of each pulse may be set as desired in relation to properties of the actual system 100 and/or of other systems with which the entanglement is to be made. In an example for an NV defect in diamond, $t_r$ may be in a range of 0.5-10 microseconds, preferably 1-9 μs, or better 2-8 μs such as 3-7 μs, e.g. $t_r$=5 μs; t' may be in a range of several tens to hundreds of nanoseconds, e.g. in a range 50-500 ns, preferably 75-400 ns, such as 100-300 ns, e.g. t'=200 ns; $t_{mw}$ may be in a range of a few 10 s of nanoseconds to microseconds, dependent of the system and the microwave power used. E.g., $t_{mw}$ may be in a range of 1-5 microseconds, e.g. 2-4 μs such as 2.5-3.0 μs, e.g. $t_{mw}$=2.8 μs. The time $t_1$ may depend on parameters outside the scope of interest of the present disclosure, e.g. distances to further objects and/or detection speeds. Note that each electromagnetic pulse referred in this primitive may be, in practice, a single pulse at one frequency (with a suitable frequency bandwidth) or a combination of pulses and/or frequencies, any of which may comprise one or more time-varying frequencies such as a frequency sweep.

In an entanglement protocol, the entanglement primitive is executed repeatedly, e.g. any number up to $10^7$ being feasible, e.g. $10^3$, $10^4$, $10^5$, $10^6$ times (see also the discussion regarding $N_{network}$ above).

During such repetitions of the entanglement primitives, the nuclear spin may be repeatedly subjected to controlled rotation to mitigate dephasing. E.g. the nuclear spin may be subjected to one or more spin echo sequences such as XY8 decoupling sequences; as schematically indicated in FIG. 2(*c*). Such sequence may comprise that, interleaved with repetitions of the entanglement primitive and while N repetitions of the entanglement primitive are applied, after N/16 repetitions of the entanglement primitive a microwave π pulse for data qubit rotation is applied followed by another N/16 repetitions of the entanglement primitive. However, also other decoupling strategies may be applied to decouple the nuclear spin from the electron spin.

After completion of a series of primitives including nuclear dynamic decoupling, the expectation value of the nuclear spin in the associated eigenbasis may be measured, $\langle \hat{\sigma}_j \rangle = \mathrm{Tr}(\rho\hat{\sigma}_j)$ where $\sigma_j$ are nuclear spin Pauli operators, $j \in \{x, y, z\}$.

After each experimental run, the measurement may be recorded. The measurement results may be further analyzed by performing charge-resonance (CR) checks for post selection. Such CR check may comprise detecting a predetermined number of photons indicative of one or more electron spin states of the wanted charge state of the electron spin host. A CR check may comprise, e.g. two-laser probe measurements (here in particular on the E', $E_y$ transitions) to verify that the electron spin host remained in the wanted state, e.g. $NV^-$, during the run and that the electron spin and associated radiation systems remained on resonance throughout the experiment (indicative of the electron spin state).

FIG. 2(*d*) indicates data qubit expectation value in the encoded state eigenbasis, as a function of the number N of entanglement attempts i.e. applied primitives P (see (b)), averaged over the six cardinal states, in which the nuclear spin was prepared. The experiments were performed on an optically active NV-defect and a $^{13}C$ nuclear spin in Type-IIa isotopically purified diamond, with a $^{13}C$ concentration of 0.01% to 0.05% $^{13}C$, at a temperature of 4 K. In FIG. 2(*d*) diamonds correspond to no post selection. Squares and circles correspond to post-selection on measuring ≥1 photons (squares) and ≥5 photons (circles) in a CR check performed at the end of the run, respectively. More photons detected in the CR check is indicative of a higher expectation value of the electron spin host remaining in the wanted charge state $NV^-$ and the electron spin being in the desired state or being readily resettable into the desired state. Clearly, the higher the CR check result, the longer the decoherence time of the nuclear spin. The results show: without check: $N_{1/e}$=1.33(4). $10^5$ entangling primitives, 1.20 (4) s of continuous entanglement attempts; with CR check of ≥5 photons: $N_{1/e}$=2.07(8). $10^5$ is achieved, well over 2 seconds of continuous entanglement attempts. Further improved decoherence times were found with strong microwave pulses, so that the sequence is shorter, e.g. primitive duration 6.3 μs instead of 9 μs for the results presented here (not shown). For both primitive durations (6.3 μs and 9 μs), the measured decoherence timescales are comparable to those arising from intrinsic spin-bath dynamics. This indicates that the entanglement sequence only weakly increases the dephasing of the $^{13}C$ spin. This also goes to show that loss of the charge state of the NV-defect during the entanglement protocol is a crucial factor in determining decoherence of the nuclear spin, and therewith operation of a quantum memory and quantum network.

In the above experiments, and in all work up to now, an ionization event ($NV^- \rightarrow NV^0$) at some point in the sequence has caused near-complete dephasing of the $^{13}C$ spins. This was because such events occur stochastically, the subsequent electron spin dynamics are unknown, and, as discussed above (see Eq. 1 and FIG. 1(*b*)), each electron spin state causes different $^{13}C$ spin evolution.

However, it has now been found that the electron spin dynamics subsequent to an ionization event may be known, at least to some extent, so that $^{13}C$ spin evolution may be knowable and may be accounted for in subsequent operations.

Further, it has now been found that charge state resetting, resetting a charge state of the electron spin host from an unwanted charge state to the wanted charge state, is possible without inducing unacceptable decoherence by irradiating the electron spin host with electromagnetic radiation promoting the change of the charge state of the electron spin host from the unwanted charge state to the wanted charge state, or, preferably, causing the change of the charge state. This electromagnetic radiation may in particular be resonant laser light.

In particular, for an NV-defect in diamond, irradiation with laser light is known for resetting the NV-defect. However, irradiation with off resonant laser light, for example 515 nm or 532 nm, is known to not effectively reset the charge state (e.g. having a low resetting probability of ~70%), additionally, such off resonant excitation is known to scramble the local charge environment causing spectral diffusion. However, a pulse of yellow light at a wavelength of 575 nm was found to recharge the NV-defect from $NV^0 \rightarrow NV^-$ and in particular that such recharging occurs with very high probability, typically >95% such as >97% or even 99% for well-tuned laser light, substantially without adverse effect to (e.g. causing loss of) the quantum state of the nuclear spin data qubit (fidelity loss at about 1% or below); the power and/or duration of the pulse largely determine its effect. Suitable pulse durations of a beam focused onto the NV defect may be in a range of 0.2-2 milliseconds, preferably in a range of 0.3-1.5 ms, such as 0.4-1.2 ms, e.g. 0.5-1.0 ms, at pulse powers in a range of 200-2000 nanoWatts, preferably 300-1500 nW such as 400-1200 nW, e.g. in a range of 500-1100 nW like 1000 nW; or, respectively with a pulse energy of 400-800 picoJoule, preferably 450-750 pJ, such as 500-600 pJ. Stronger shorter pulses may be considered more beneficial for rapid recharging but may have an effect on the charge environment (e.g. other defects in the sample) or heating.

It is noted that an NV-defect may also be ionized as desired by irradiation with electromagnetic radiation, e.g. by using two red laser beams for driving the E' and Ey transitions simultaneously at relatively high power, compared to their use for the entanglement primitive, e.g. about 40 times as high (ca 50 nW $E_y$ and 500 nW E' for ionization, instead of 8 nW $E_y$ and 1.5 nW E' for use in a CR check and 1000 nW $E_y$ without E' for spin pumping).

FIG. 3(*a*) indicates an experimental sequence and FIG. 3(*b*) presents measurement results showing that ionization and reionization of an NV-defect are possible without significant decoherence (proof not shown separately), but also that in the $NV^0$ charge state decoherence of the nuclear spin is significantly faster than in the $NV^-$ state.

FIG. 3(*a*) indicates an experimental sequence comprising the steps of (I) preparation of an NV defect in the $NV^-$ charge state, and initializing the nuclear spin magnetically coupled to the NV defect in a predetermined quantum state, e.g. state $|+\rangle$. This may be checked by a CR check (not indicated). Next, (II) when successfully thus prepared, the nuclear spin qubit is brought in a quantum superposition state and thereafter NV charge state is changed $NV^- \rightarrow NV^0$, by ionization of the defect. Then (III) the nuclear spin is allowed to evolve freely for a time period t while the NV defect remains in the unwanted $NV^0$ charge state. Then (IV) after the time t, the NV defect is recharged $NV^0 \rightarrow NV^-$ by applying the recharge pulse. Next (V) the nuclear spin is read out in the X-basis and the results (post-selected via CR checks as before) are plotted in FIG. 3(*b*). The inset in FIG. 3(*b*) is a detail on enlarged scale showing coherent oscillations corresponding to precession of the nuclear spin.

Figure 4:
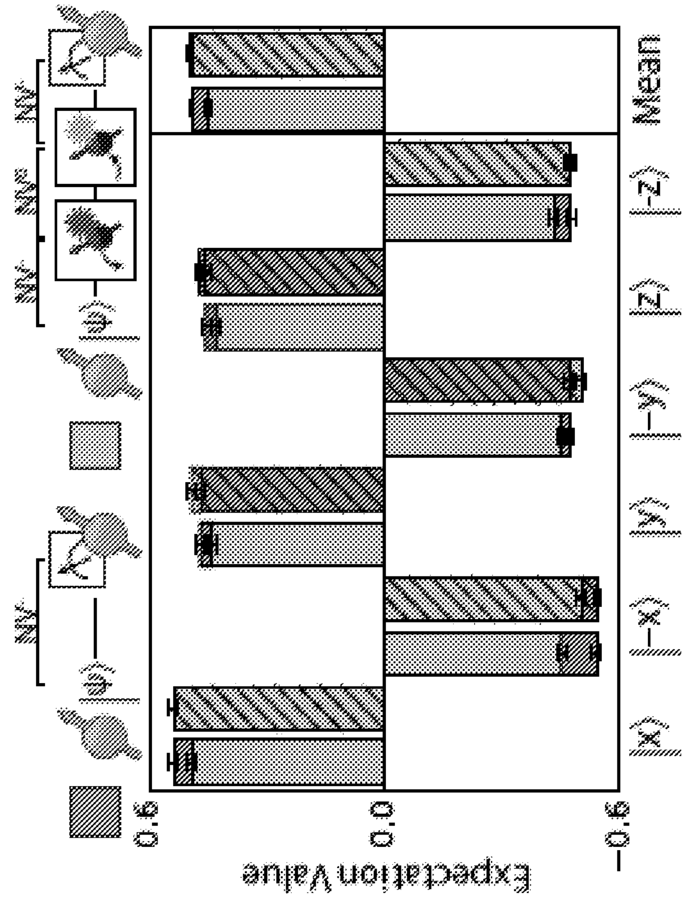
FIG. 4 shows a comparison of the experiment of FIGS. 3(*a*)-3(*b*) (light bars) with a reference measurement wherein the nuclear spin was idling (dark bar sections)

It was found that in the $NV^0$ charge state, decoherence of the nuclear spin is significantly faster than in the $NV^-$ state. FIG. 4 shows a comparison of the experiment of FIGS. 3(*a*)-3(*b*) (light bars) with a reference measurement wherein the nuclear spin was idling (dark bar sections). For this, the $^{13}C$ nuclear spin was prepared in each of the six cardinal states (see above) and subjected to the ionization and recharge sequence or allowed to idle. In particular, FIG. 4 shows the expectation values obtained when applying the ionization and recharging process prior to measurement (light), or when measuring immediately after state preparation (dark). This shows protection of an arbitrary data qubit state under NV charge cycling. Solid bars correspond to all measured data, hatched bars correspond to post-selection on finding the NV in the negative charge state.

Without post-selecting cases in which the NV returned to the bright state, a reduction of the spin expectation values of 8(1)% is found (averaged over the cardinal states) when applying the charge-state cycle (FIG. 3(*c*)). Upon post-selection, a negligible difference between the cases is found (the charge-cycle scenario outperforms immediate measurement by 1(1)%).

Protection of the nuclear spin from ionization of the electron spin host within an entanglement protocol may therefore concentrate on: mitigating electron spin dynamics when in the unwanted charge state ($NV^0$) and reducing dwell time of the electron spin host in the unwanted charge state ($NV^0$).

Mitigating electron spin dynamics when in the unwanted charge state may be done by determining an average unwanted state electron spin value of the electron spin when the electron spin host is in the unwanted state of the electron spin host. This may be done by applying the sequence of FIG. 3(*a*) without preparation of the nuclear spin in a superposition, but with applying a nuclear spin radiofrequency ir-pulse during occupation of the ionized state; when a single nuclear spin resonance transition is found matching the Larmor frequency of the nuclear spin host, the electron spin may be considered a fast average over the spin states, akin to motional narrowing.

Then, the average nuclear spin precession frequency during the entangling primitives should match the precession for $NV^0$, else additional dephasing will occur at the difference frequency until recharging occurs. This can be realized by alternating the choice of $NV^-$ qubit-basis $m_s=\{0, -1\}$, $\{0,+1\}$ between entangling attempts.

Therefore an embodiment comprises the step of selecting different electron spin states ($m_s=-1$, 0, +1) as mutually different basis states (10>, 1+1>; 1−1>, 10>) for a series of the entanglement primitives, providing an average series electron spin value of the series of entanglement primitives in accordance with the average unwanted state electron spin value, preferably substantially matching the average unwanted state electron spin value. The better the matching, the smaller the difference.

In case the electron dynamics is erratic but is slower than desired for sufficient averaging, the step of entanglement may comprise the step of driving electron spin transitions between different electron spin states ($m_s=-\frac{1}{2}$, $+\frac{1}{2}$) of the electron spin when the electron spin host (NV) is in the unwanted state of the electron spin host ($NV^0$) for controlling the average unwanted charge state electron spin value. This situation may be called engineered motional narrowing.

In other cases when the electron spin host (NV) is in the unwanted state of the electron spin host ($NV^0$) and the electron spin state ends up in the same state ($m_s=-\frac{1}{2}$ or $m_s=+\frac{1}{2}$) with high probability and the spin stays in the respective state throughout the primitive, the phase evolution of the nuclear spin as a result of that repetitive and constant electron spin value may be determined and be used accordingly elsewhere in the system. Also or alternatively, different electron spin states ($m_s=-1$, 0, +1) may be selected as mutually different basis states ($|0\rangle$, $|+1\rangle$; $|-1\rangle$, $|0\rangle$) for a series of the entanglement primitives (EP) to account for that repetitive and constant electron spin state value.

It is noted that the $NV^0$ spin-$T_1$ may increase with reduction of impurities, or under different magnetic fields, which would result in faster nuclear spin dephasing. This challenge might be overcome by either inducing fast $NV^0$ spin flips using microwave driving, or by performing feedback correction using recently demonstrated NV0 optical spin-readout at high magnetic fields.

Reducing dwell time of the electron spin host in the unwanted charge state ($NV^0$) may be done according to the following insights re-charging within the entangling sequence can be realized by irradiating the electron spin host with electromagnetic radiation promoting or causing the change of the charge state of the electron spin host from the unwanted charge state to the wanted charge state, in particular adding auxiliary excitation (optical irradiation with yellow light at $\lambda$=575 nm during the $NV^-$ spin-reset pulses, which prevents extended periods in which the NV resides in the neutral charge-state. In case the recharging light is applied when in fact the NV defect was not in the unwanted charge state, the light may be applied but the instance be rather considered as an attempted charge state resetting.

A drawback of this approach is that extensive application of yellow light may induce spectral diffusion due to ionization of the P1 bath or other impurities. This may be mitigated by application of the light only during some of the entanglement primitives.

A further, possibly less intrusive approach is performing a status check, comprising determining a charge state of the electron spin host, e.g. to interleave periodic CR checks within the entangling sequence.

Figures 5A, 5B, 5C, 5D:
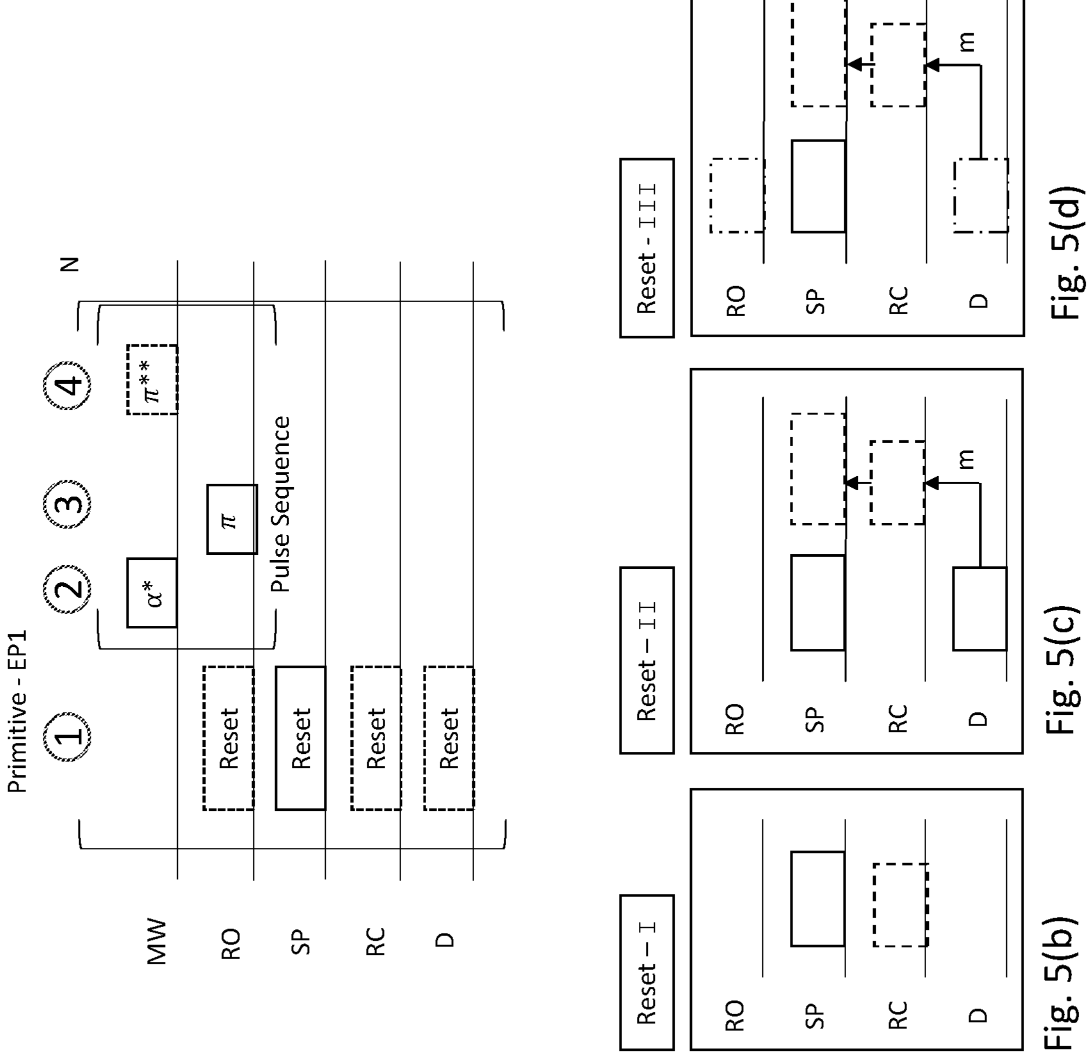
FIG. 5(*a*) indicates a suitable entanglement primitive including recharging.

FIG. 5(*a*) indicates a suitable entanglement primitive including recharging. When comparing with FIG. 2(*b*), one may recognize in the primitive first a resetting step (marked "1") and an entanglement pulse sequence comprising a microwave α-pulse (marked "2"), an optical π-pulse (marked "3") and a further, optional, microwave π-pulse (marked "4").

The entanglement primitive may use different electromagnetic radiation types in this example, from as many different sources. Note that further and or different sources may be provided (not shown) and possibly also be used in the primitive. Indicated are microwave radiation pulses MW for electron spin control, optical readout laser pulses RO (preferably resonant with the E transition in case of a NV defect in diamond), optical laser pulses SP for spin reset (preferably resonant with the E' transition in case of a NV defect in diamond), optical charge state resetting laser pulses RC for recharging the electron spin host from the unwanted state to the wanted state, a photodetector D.

FIGS. 5(*b*)-5(*d*) show different resetting block options.

FIG. 5(*b*) shows a basic version, "Reset-I". In this version, a spin resetting pulse SP is used. A recharge pulse is used for (at least attempting) recharging the electron spin host from the unwanted state to the wanted state. Use of the recharging pulse RC is optional. If a recharging pulse is omitted, the reset pulse block of FIG. 2(*b*) is obtained. The recharging pulse, if applied, may be used every repetition of the primitive, or in only a small fraction m of the N instances of application of the entanglement primitive. Note that in this and any other case the spin reset pulse SP should preferably at least end later (and possibly also start later) than the recharge laser to ensure spin resetting also in the case of a late charge state reset.

FIG. 5(*c*) shows an option Reset-II wherein a photodetector is used to detect fluorescence from the electron spin host subject to the spin pumping pulse. This provides a state check if fluorescence is detected below a predetermined amount, e.g. less than a few photons, such as less than 10 photons, e.g. less than 5 or less than 3 photons, the laser and the electron spin pump transition have lost resonance and/or the spin pump may be considered unsuccessful, e.g. since chances of a successful entanglement attempt may be considered too low. In such case, ionization of the electron spin host may be suspected, and a recharge pulse may be applied to recharge the electron spin host, and the spin reset pulse is extended or repeated for electron spin pumping. Note that the number of photons obtained or obtainable from the transition(s) used may be very low and depend on the nature of the electron spin host and/or the solid-state material. In some cases for a state check, much less than one photon per primitive may be expected; in such case integration over several repetitions of the primitive may be used for the determination. E.g., the total number of photons detected after a predetermined number of repetitions may be used as a signal for ionization, wherein typically that total number of photons would be one photon or zero photons.

FIG. 5(*d*) shows a further option Reset-Ill. Compared to FIG. 5(*c*), initially also a readout pulse is used to provide a charge state check of the electron spin host. In combination with the spin reset pulse a charge resonance check (CR-check) is performed. When the detector detects insufficient photons in a given time period, the CR check is considered unsuccessful or failed, which is indicative of an ionization event of the electron spin host in a previous repetition of the primitive and a recharge pulse is applied, as in FIG. 5(*c*).

Thus, by operation of any of the reset blocks in the entanglement primitive, selective recharging of the electron spin host may be performed.

After the reset block, the electron qubit entangling sequence proper is performed. In the primitive, the addressing transition of the microwaves MW for the α-pulse may be altered between primitives for selecting different basis states of the electron qubit and/or the microwave n-pulse is performed between electron $m_s$=+1, −1 states for providing an average series electron spin value of a series of entanglement primitives, which may be in accordance with the average unwanted state electron spin value.

Further, it is considered that the concentration of nuclear spin hosts is relevant. This concentration causes interaction between the nuclear spin host of interest and neighboring nuclear spin hosts. The coupling between the electron spin host and the nuclear spin host is also of relevance since adverse electron spin dynamics accelerate decoherence of the nuclear spin. A reduced isotopic concentration results in enlarged separation between the electron spin host and the nuclear spin therewith reducing interaction strength. It is considered that possibly reduced gate speeds due to this are outweighed by improved decoherence behavior.

To estimate a desired $^{13}$C isotopic concentration, n, for realizing a robust quantum network memory, the following relations may be used.

For protection from ionization, the goal is to realize a system in which the process ionization ($NV^- \rightarrow NV^0$)—time spent in unwanted states ($NV^0$)—recapture ($NV^0 \rightarrow NV^-$) does not cause a significant uncertainty on the phase of the $^{13}$C memory qubits.

First the ionization and recharge processes themselves may be considered. These processes can be associated to a dephasing due to a phase uncertainty ϕ. Because we expect events to be rare, we require the phase uncertainty ϕ to be sufficiently small. For example, for a desired fidelity loss smaller than 1%, ϕ must be smaller than arccos(0,99)=0.14 rad. Generally, ϕ depends linearly on the coupling between the electron spin and nuclear spin J.

Particular desired values for J can be obtained (with high probability) by choosing the $^{13}$C-concentration n. For this it is required to know a relation between the typical coupling J and the concentration n. The exact couplings J of a given combination of an electron and nuclear spin can only be obtained from Density Functional Theory calculations or experiment. For the simplified case of low n, the electron-$^{13}$C coupling is predominantly dipolar, such that J∂$r^{-3}$, where J is the electron-$^{13}$C coupling and r is the distance between the respective electron and nuclear spins, which distance r scales with n-⅓. Therefore, in this regime, J c n; e.g. see Maze et al., Phys. Rev. B 78, 094303 (2008). A useful rule of thumb is that for n=1.1% (natural concentration), the typical J is e.g. 100 kHz. Therefore, for small n, one can use the approximate relation J=n*100/0.011 kHz (note that this is valid only for small n).

Next, requirements for the nuclear spin coherence in the unwanted state ($NV^0$) are considered. Here, it may be desired to be in the so-called motional narrowing regime, where spin-relaxation of the electron spin (in the unwanted charge state of the host) is sufficiently fast that it results in an effective decoupling process for the nuclear spin (the occupation of the spin states $m_s$=±½ in the $NV^0$-state average to zero magnetic moment), see also: Maurer et al., Science 336, 6086 (2012), Pfender et al., Nat. Commun. 8, 1 (2017). This motional narrowing regime is achieved for J<<

$$T1_{e,charge}^{-1},$$

where $T1_{e,charge}$ is the spin-relaxation time of the electron spin in the unwanted charge state. In this regime, the dephasing of the nuclear spin is characterized by a time $$T2_{13C,charge} \propto J^{-2} T1_{e,charge}^{-1}.$$

For the nuclear spin to be protected from charge-state switching events, $T2_{13C,charge}$ must be much longer than the time taken to recover from such a switching event via optical charge reset. This requirement can be met by either reducing j (by using weaker couplings, typically found in lower concentration n samples, or by reducing $T1_{e,charge}$, for example by using microwave driving to induce spin flips of the electron spin in the unwanted charge state in so-called "engineered motional narrowing", or by a combination of both reducing J and spin flip driving.

Finally, we consider the relationship between j and the dephasing experienced by the quantum memory during entanglement generation. A favourable relationship is considered a prerequisite for the system to be able to function as a quantum network node. In the case that the nuclear spin dephasing in each entanglement attempt is dominated by a stochastic timing uncertainty associated with optical spin reset of the electron spin, it can be derived that, having prepared the nuclear spin in a coherent superposition state, the residual nuclear spin coherence after N entangling attempts is given by:

$$\sqrt{\langle\sigma_x\rangle^2 + \langle\sigma_y\rangle^2} = \left(1 - p_{|1\rangle} + p_{|1\rangle} \exp\left[-J^2\tau^2/2\right]\right)^N,$$

Where $\langle\sigma_x\rangle$ and $\langle\sigma_y\rangle$ are the expectation values of the spin-½ Pauli-X and Pauli-Y operators, $p_{|1\rangle}$ is the probability to undergo the stochastic optical spin reset in each attempt and $\tau$ is the timing uncertainty of the process.

As indicated before, a useful metric is the number of entangling attempts after which the coherence has decayed to 1/e: $N_{1/e}$, which may be referred to as a memory lifetime. Setting $\sqrt{\langle\sigma_x\rangle^2+\langle\sigma_y\rangle^2}=1/e$ in the above equation, we can derive:

$$N_{1/e} = -\left(\log\left(1 - p_{|1\rangle} + p_{|1\rangle} \exp\left[-J^2\tau^2/2\right]\right)\right)^{-1}.$$

In the limit that $(J^2\tau^2/2)<<1$, this may be simplified to the form:

$$N_{1/e} \approx \left(p_{|1\rangle} J^2\tau^2/2\right)^{-1},$$

where we see that the number of entangling attempts scales inverse-quadratically with the coupling strength of the nuclear spin, J. Therefore, in this scenario, the relationship between the typical memory lifetime and the isotopic concentration is given by:

$$N_{1/e} \propto n^{-2},$$

This relationship applies in any scenario where the nuclear spin undergoes a random walk parameterized by small phase steps, $\delta\phi=J\delta t$, $\delta\phi<<1$. Example sources of such events in any given entangling attempt are the failure of the electron spin initialization process, a spin-flip of the electron spin after an optical pulse used to generate spin-photon entanglement, or errors associated with microwave pulses used to prepare electron-spin superposition states and to decouple the electron spin, see also Blok et al., Farad. Discuss 184 (2015), Kalb et al., Phys. Rev. A 97(6) (2018), Reiserer et al., Phys. Rev. X 6 (2016)

Note that these are general relations from which estimates of the desired concentration can be made for a given entangling sequence, given a reference data-point of the given entangling sequence and another nuclear spin concentration. A more precise prediction of the nuclear spin dephasing for a given situation can only be achieved using detailed numerical modelling or experimental characterization.

Various embodiments described herein may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

Elements and aspects discussed for or in relation with a particular embodiment may be suitably combined with elements and aspects of other embodiments, unless explicitly stated otherwise.

The invention claimed is:

1. A method for operating a quantum network node, wherein the node comprises a wide-bandgap solid state material comprising at least one electron spin host providing an electron spin for a communication qubit and at least one nuclear spin host providing a nuclear spin for a data qubit, the electron spin and the nuclear spin being magnetically coupled;

wherein the method comprises sequential steps of:

data qubit state preparation, comprising preparing the nuclear spin in a predetermined nuclear-spin quantum state;

entanglement, comprising subjecting the electron spin to an entanglement protocol comprising multiple repetitions of an entanglement primitive (EP, EP1) for entangling with another quantum system; and data qubit state use, comprising performing operations on and/or readout of the data qubit state or causing entanglement between the data qubit state and a further quantum system;

wherein the electron spin host occupies a wanted state of the electron spin host ($NV^-$), or an unwanted state of the electron spin host ($NV^0$);

wherein the wanted state is a wanted charge state and the unwanted state is an unwanted charge state, and the method comprises that the entanglement protocol comprises a step of charge state resetting: resetting a charge state ($NV^-$; $NV^0$) of the electron spin host from the unwanted charge state to the wanted charge state; and/or the method comprises a step of determining an average unwanted state electron spin value of the electron spin when the electron spin host is in the unwanted state of the electron spin host ($NV^0$), and wherein the entanglement protocol comprises a step of varying electron spin states (ms=−1, 0, +1) in a series of the entanglement primitives (EP1), providing an average series electron spin value of the series of entanglement primitives in accordance with the average unwanted state electron spin value.

2. The method according to claim 1, wherein the method comprises that the entanglement protocol comprises the step of charge state resetting, and wherein the step of charge state resetting comprises irradiating the electron spin host with electromagnetic radiation promoting or causing the change of the charge state of the electron spin host from the unwanted charge state to the wanted charge state.

3. The method according to claim 2, wherein the data qubit has a coherence time, and the method comprises performing the step of charge state resetting in a time interval shorter than the coherence time.

4. The method according to claim 1, comprising selecting a portion of the solid-state material comprising the nuclear spin host and the electron spin host, wherein the nuclear spin host and the electron spin host have a predetermined coupling strength (J), wherein the coupling strength (J) is between 100 Hz and 100 MHz; and/or in the portion of the solid-state material the concentration of nuclear spin hosts is between 0.01% and 1%.

5. The method according to claim 1, wherein the entanglement protocol comprises in or between plural repetitions of entanglement primitives (EP) the step of charge state resetting or at least a step of attempting charge state resetting.

6. The method according to claim 1, wherein the entanglement protocol comprises the step of performing a status check, comprising determining a charge state of the electron spin host, and wherein the entanglement protocol comprises selectively executing or not, on the basis of the status check, the step of charge state resetting.

7. The method according to claim 6, wherein the status check comprises detecting a predetermined number of photons indicative of one or more electron spin states of the wanted charge state of the electron spin host.

8. The method according to claim 1, wherein during the step of entanglement, the nuclear spin is repeatedly subjected to controlled rotation.

9. The method according to claim 1, comprising the step of determining an electron spin state of the electron spin host when the electron spin host is in the unwanted state ($NV^0$).

10. The method according to claim 1, wherein the method comprises the step of determining an average unwanted state electron spin value of the electron spin when the electron spin host is in the unwanted state of the electron spin host ($NV^0$), and wherein the entanglement protocol comprises the step of selecting different electron spin states ($m_s$=−1, 0, +1) as mutually different basis states ($|0\rangle$, $|+1\rangle$; $|-1\rangle$, $|0\rangle$) for a series of the entanglement primitives (EP), providing an average series electron spin value of the series of entanglement primitives (EP) in accordance with the average unwanted state electron spin value.

11. The method according to claim 10, wherein the step of entanglement comprises the step of driving electron spin transitions between different electron spin states of the electron spin when the electron spin host is in the unwanted state of the electron spin host ($NV^0$) for controlling the average unwanted charge state electron spin value.

12. The method according to claim 1, wherein the solid-state material comprises or is one selected from the group consisting of diamond, silicon carbide, silicon, and 2-dimensional materials, and wherein the electron spin host is formed by an optically active defect site in the solid-state material and the nuclear spin host is formed by an isotope atom in the solid state having a nonzero nuclear spin.

13. A system for operating a quantum memory or quantum network node, comprising:

a wide-bandgap solid state material comprising at least one electron spin host providing an electron spin for a communication qubit and at least one nuclear spin host providing a nuclear spin for a data qubit, the electron spin and the nuclear spin being magnetically coupled;

a first electromagnetic radiation system for manipulating the electronic spin host;

a second electromagnetic radiation system for manipulating the nuclear spin host;

a control system operably connected with the first electromagnetic radiation system and the second electromagnetic radiation system;

wherein the electron spin host occupies a wanted state of the electron spin host ($NV^-$) in which the electron spin is available for an entanglement primitive (EP), or an unwanted state of the electron spin host ($NV^0$) in which the electron spin is not available for the entanglement primitive (EP);

wherein the system further has means configured to execute a method comprising sequential steps of:

data qubit state preparation, comprising preparing the nuclear spin in a predetermined nuclear-spin quantum state;

entanglement, comprising subjecting the electron spin to an entanglement protocol comprising multiple repetitions of the entanglement primitive (EP, EP1) for entangling with another quantum system; and data qubit state use, comprising performing operations on and/or readout of the data qubit state or causing entanglement between the data qubit state and a further quantum system;

wherein the electron spin host occupies a wanted state of the electron spin host ($NV^-$), or an unwanted state of the electron spin host ($NV^0$);

wherein the wanted state is a wanted charge state and the unwanted state is an unwanted charge state, and the method comprises that the entanglement protocol comprises a step of charge state resetting: resetting a charge state ($NV^-$; $NV^0$) of the electron spin host from the unwanted charge state to the wanted charge state; and/or the method comprises a step of determining an average unwanted state electron spin value of the electron spin when the electron spin host is in the unwanted state of the electron spin host ($NV^0$), and wherein the entanglement protocol comprises a step of varying electron spin states (ms=−1, 0, +1) in a series of the entanglement primitives (EP1), providing an average series electron spin value of the series of entanglement primitives in accordance with the average unwanted state electron spin value.

14. The system according to claim 13, further comprising an electromagnetic radiation system for irradiating the electron spin host with resonant electromagnetic radiation for resetting a charge state of the electron spin host from the unwanted charge state ($NV^0$) to the wanted charge state ($NV^-$).

15. The system according to claim 13, wherein the solid-state material comprises diamond, the electron spin host is an optically active defect site in the diamond, selected from a group consisting of a nitrogen-vacancy (NV) center, a silicon-vacancy (Si-V) center, a lead-vacancy (Pb-V) center or a tin-vacancy (SN-V) center; and wherein the nuclear spin host is formed by a $^{13}C$ atom.

16. A non-transitory computer readable storage medium having stored thereon which when executed by a processor operate a quantum network node, wherein the node comprises a wide-bandgap solid state material comprising at least one electron spin host providing an electron spin for a communication qubit and at least one nuclear spin host providing a nuclear spin for a data qubit, the electron spin and the nuclear spin being magnetically coupled;

wherein the instructions comprise sequential steps of:

data qubit state preparation, comprising preparing the nuclear spin in a predetermined nuclear-spin quantum state;

entanglement, comprising subjecting the electron spin to an entanglement protocol comprising multiple repetitions of an entanglement primitive (EP, EP1) for entangling with another quantum system; and data qubit state use, comprising performing operations on and/or readout of the data qubit state or causing entanglement between the data qubit state and a further quantum system;

wherein the electron spin host occupies a wanted state of the electron spin host ($NV^-$), and an unwanted state of the electron spin host ($NV^0$);

wherein the wanted state is a wanted charge state and the unwanted state is an unwanted charge state, and the method comprises that the entanglement protocol comprises the step of charge state resetting: resetting a charge state ($NV^-$; $NV^0$) of the electron spin host from the unwanted charge state to the wanted charge state; and/or the method comprises the step of determining an average unwanted state electron spin value of the electron spin when the electron spin host is in the unwanted state of the electron spin host ($NV^0$), and wherein the entanglement protocol comprises the step of varying electron spin states (ms=−1, 0, +1) in a series of the entanglement primitives (EP1), providing an average series electron spin value of the series of entanglement primitives in accordance with the average unwanted state electron spin value.

17. The method according to claim 5, comprising irradiating the electron spin host with electromagnetic radiation promoting or causing the change of the charge state of the electron spin host from the unwanted charge state ($NV^0$) to the wanted charge state ($NV^-$).

18. The method according to claim 8, comprising repeatedly subjecting the nuclear spin to a decoupling sequence.

19. The system according to claim 13, wherein the other quantum system is another quantum network node.

20. The method according to claim 2, wherein the electromagnetic radiation comprises resonant optical radiation.

* * * * *